Patented Dec. 28, 1943

2,337,666

UNITED STATES PATENT OFFICE 2,337,666

WAX COATING FOR STORAGE HAMS

Carl H. Koonz and James D. Ingle, Chicago, Ill., assignors to Industrial Patents Corporation, Chicago, Ill., a corporation of Delaware No Drawing. Application March 24, 1941, Serial No. 384,952

9 Claims. (Cl. 99—169)

This invention is directed to a new method and composition for treating meats, and more particularly it relates to a novel composition for coating hams for frozen storage.

The problem of storing hams in a frozen condition has been studied for many years and numerous methods have been devised and considered for such handling of hams. The frozen storage tends to desiccate the meat or similar products because of the condensation of moisture from the atmosphere at the refrigeration source, and the re-humidification of the atmosphere at the expense of the stored products. Attempts have been made to prevent this drying action by packaging the food product in a sheet material such as Cellophane, Pliofilm or latex bags, but it is a difficult procedure to completely wrap and seal the meat or other food with such materials. Some success has been attained in the packaging of green hams in moisture-proof Cellophane over which is placed a stockinette. This entails considerable expense not only in the time and labor involved in applying the wrapping but also because the protective materials can be used only once. Cured hams cannot be packaged in this manner because the wrapping is unable to exclude atmospheric oxygen which rancidifies the cured hams. To protect and store cured hams, they are now placed in tierces and covered with brine. The tierces are then removed to a storage room where they are held at sub-freezing temperatures. This is a cumbersome procedure.

The present invention is directed to a method of protecting food products, particularly cured hams and green hams, by a simple and economical means employing a minimum of time, labor and space with maximum protection under all conditions of handling. In general, the method relates to the coating of food products, such as hams, with a novel amorphous wax-rubber resin coating that can be readily applied and which forms a seal around the food product, which seal is substantially impervious to water, brine, water vapor and atmospheric oxygen, and which is extremely flexible even at temperatures well below freezing. The wax-rubber resin coating can therefore resist the freezing expansion of the products without cracking. Another important consideration is that the wax-rubber resin coating can be removed by a convenient method at the end of a given storage period and be re-used an indefinite number of times.

The particular amorphous wax-rubber resin coating which is employed in this invention comprises a combination of high melting amorphous petroleum wax or similar amorphous wax having a melting point of about 140° F. to 160° F., and the rubber-resin or rubber isomer, Pliolite. The proportions of these materials may be varied widely but the most effective products fall generally within the following ranges:

I

| | Per cent |
|---|---|
| Pliolite | 7-15 |
| Amorphous wax (M. P. ca. 140° F.) | 70-90 } 85-93 |
| Amorphous wax (M. P. ca. 160° F.) | 0-20 |

The following specific combinations have been found unusually satisfactory, particularly the latter:

II

| | Per cent |
|---|---|
| Pliolite | 8 |
| Amorphous wax (M. P. ca. 140° F.) | 72 |
| Amorphous wax (M. P. ca. 160° F.) | 20 |

III

| | Per cent |
|---|---|
| Pliolite | 11 |
| Amorphous wax (M. P. ca. 140° F.) | 71 |
| Amorphous wax (M. P. ca. 160° F.) | 18 |

Pliolite is a synthetic rubber-resin generally identified as rubber isomer. It is a thermoplastic condensation derivative of rubber usually prepared by treating rubber in solution in a volatile organic solvent with an amphoteric metal halide, such as chlorostannic acid, stannic chloride, aluminum chloride or ferric chloride. The resulting product is generally poured into a large volume of water containing a reducing agent, such as sodium sulphite, and the mixture is then agitated vigorously to produce a fine emulsion. The volatile solvent is then removed by steam distillation and the synthetic rubber-resin or rubber isomer precipitated in finely divided form. The preparation of this synthetic rubber-resin is described in United States Patent No. 2,052,423, granted August 25, 1936.

In preparing the rubber-resin and wax composition of this invention, the high melting amorphous petroleum waxes are melted at a temperature of about 220° F. The desired quantity of rubber-resin, e. g., 7-15%, in a finely divided form, is added to and thoroughly mixed with the melted wax. The heating is discontinued and the mixture is agitated vigorously until it begins to thicken. The rubber-resin or isomer first swells, and then when the mixture is reheated to about 220° F. a homogeneous liquid is formed.

The foregoing formulas are given merely as preferred examples, but the percentages of the various constituents may be varied within wide limits, usually as set forth above, depending upon the holding temperatures to be used in the frozen storage and to some extent on the nature and handling of the product. Although the two constituents aforementioned are the only ones essential to the composition, other non-toxic materials may also be employed in small quantities, such as dyes, pigments, aromatic materials, germicides, flavoring substances such as essential oils, wetting agents, antioxidants, or the like. It should be remembered that these amorphous waxes are substantially different than paraffin, which material is crystalline and of a much lower melting point. Compositions containing substantial proportions of paraffin wax will embrittle and crack at temperatures below 32° F. and if used to coat hams or the like would crack badly because of the expansion of the meat on freezing, and being brittle would chip readily upon the slightest handling. Obviously, such a composition would be wholly unsatisfactory. It has been found that the combination of the rubber-resin derivative Pliolite with the amorphous waxes keeps the waxes in an amorphous or microcrystalline state even at temperatures well below freezing. It is this unusual and surprising characteristic of the novel compositions which makes them particularly effective in the present process. It is surprising that these higher melting compositions (e. g., about 150° F.) which consequently have little tendency to become tacky or soft, have such extraordinary flexibility at the low temperatures. These composition possess greater tensile strength, plasticity and resistance to cracking at sub-freezing temperatures than many other lower melting wax compositions used for other purposes.

Another surprising feature of the present compositions is that they may be removed from the meat or other product after frozen storage as readily as Cellophane or other sheet material upon the partial or complete defrosting of the product. The film comes off as a large continuous sheet which may be remelted and re-used.

The coating composition and process for using are particularly adapted to the storage of hams, hence the following examples are directed to the treatment of such materials, but it is to be understood that they are given for the purposes of only illustrating the invention and are not intended to limit the invention either to the material treated, the coating compositions or the method of handling.

The uncovered green or cured hams with the customary string on the shank end are hung on a moving endless chain. At one point along the chain travel, a vessel containing the molten composition, e. g., 11% Pliolite, 71% 140° F. wax, and 18% 160° F. wax, at a temperature of about 180° F. is automatically raised around the ham to cover the entire surface thereof with the novel coating. This operation is performed in a room where the temperature is low enough to "set up" the rubber resin-wax coating rapidly. The coated hams are then carried on a chain to the storage room where they are taken from the chain and hung on racks to freeze. After being partially or thoroughly frozen, the hams may be placed in bins to be held until needed. This usually requires freezing for one day after coating before transferring to the bins.

Another method of handling the hams is to first freeze the hams either completely or partially and then to treat as outlined for handling the non-frozen hams. With frozen hams it is possible to store them in bins a few minutes after the coating.

Still another procedure of handling the hams or other meat, poultry, fruits, or vegetables is to coat the product to be frozen with the novel composition, permit it to set, and then to immerse the coated product in a brine, such as sodium chloride brine or calcium chloride brine, cooled to below the freezing point of water. Here again the coating withstands the freezing expansion and resists contamination by the freezing brine.

A particularly desirable method for employing the present composition is to first freeze the ham or other product, then to dip the cold ham or the like into cold water or a cold aqueous solution of sugar or a similar composition and freeze a glaze on the surface. The glazed product is then dipped in the novel composition and treated as discussed hereinbefore. One great advantage of this method is that the coating does not come directly in contact with the food product. When the coating is removed it is not contaminated with any loose fatty materials which may alter the properties of the coating during re-use.

The wax coating material constitutes an impervious layer which does not crack and thus offers maximum protection for hams while in storage bins. It prevents desiccation in both green and cured hams, and in the cured ham in particular it retards rancidity by excluding atmospheric oxygen.

The coated frozen hams are taken from the bins at the end of the desired storage period and again hung on a moving chain by means of the string on the shank ends. At an appropriate point on the chain, the coated frozen hams are automatically immersed for about two minutes in water heated to a temperature of about 115° F. This softens the wax and permits it to be removed as an unbroken sheet in a continuous operation. This removing operation is rapid and surprisingly easy. The sheet may be dipped in or flushed with water to remove any fat adhering to the wax. It is then remelted and used for dipping and coating other hams.

The wax-rubber resin coated products may merely be placed at cooler or room temperatures for a sufficient time to permit the coating to become soft enough to be removed without actual immersion in brine as above outlined. For example, hams may be taken from the freezer and placed overnight at 45° F. The following morning the coating may be removed readily.

The invention possesses many advantages over prior art methods of treating materials for frozen storage. It is believed to be the first process for coating food products or the like with an impervious material that sets up after application and that is capable of withstanding freezing expansion and handling at low temperature without cracking. It prevents desiccation and excludes atmospheric oxygen to an unprecedented degree without contaminating the food product during storage. The method is economical, convenient and practical. The coating composition is inexpensive, it is easily applied without interfering with normal production procedures, and after the storage period it can be removed readily and inexpensively in a form convenient for re-use a number of times. The coating is not only effective during freezer storage, but it also affords unequalled protection during actual freezing, particularly while immersed in freezing brines.

As many widely different embodiments of the present invention may be made without departing from the spirit or scope thereof, it is to be understood that this invention is not to be limited except as defined in the appended claims.

We claim:

1. The process of treating food products of the class consisting of meat, poultry, fruits and vegetables for storage which comprises coating the food product with a composition comprising essentially a major proportion of high melting amorphous wax and a minor proportion of Pliolite, and storing the product for a substantial period of time.

2. The process of treating food products of the class consisting of meat, poultry, fruits and vegetables for frozen storage which comprises coating the food product with a composition comprising essentially a major proportion of a high melting amorphous petroleum wax and a minor proportion of Pliolite, and storing the product at a freezing temperature for a substantial period of time.

3. A process of treating meat products for frozen storage which comprises coating the food product with a composition containing about 85% to 93% of high melting amorphous petroleum wax and about 15% to 7% of Pliolite, and storing the product at freezing temperatures for a substantial period of time.

4. A process of treating meat products for frozen storage which comprises coating the food product with a composition containing about 72% amorphous petroleum wax having a melting point of about 140° F., about 20% amorphous petroleum wax having a melting point of about 160° F., and about 8% Pliolite, and storing the product at freezing temperature for a substantial period of time.

5. The process of treating hams for frozen storage which comprises dipping the ham into a molten composition comprising essentially a major proportion of high melting amorphous petroleum wax and a minor proportion of Pliolite, removing the dipped ham, permitting the resulting coating to set, and storing the product at freezing temperatures for a substantial period of time.

6. The process of treating meat products for frozen storage which comprises chilling the food product at a freezing temperature, dipping the food product into a molten composition comprising essentially a major proportion of high melting amorphous petroleum wax and a minor proportion of Pliolite, removing the dipped food product, and storing the product at freezing temperature for a substantial period of time.

7. The process of treating ham for frozen storage which comprises chilling the ham at a freezing temperature, dipping the chilled ham into a molten composition comprising essentially a major proportion of high melting amorphous petroleum wax and a minor proportion of Pliolite, removing the dipped ham, and storing the product at a freezing temperature for a substantial period of time.

8. The process of treating meat products for frozen storage which comprises coating the meat product with a composition comprising essentially a major proportion of high melting amorphous petroleum wax and a minor proportion of Pliolite, and storing the product in a refrigerating brine solution at a normally freezing temperature for a substantial period of time.

9. The process of treating hams for frozen storage which comprises coating the ham with a composition containing about 7% to 15% of Pliolite, about 70% to 90% of an amorphous petroleum wax having a melting point of about 140° F., and about 0% to 20% of an amorphous petroleum wax having a melting point of about 160° F., and storing the product in a refrigerating brine solution at a freezing temperature for a substantial period of time.

CARL H. KOONZ.
JAMES D. INGLE.